(12) United States Patent
Farmer, Jr.

(10) Patent No.: US 6,238,068 B1
(45) Date of Patent: May 29, 2001

(54) TRUCK BED LIGHTING SYSTEM

(76) Inventor: Thomas Edward Farmer, Jr., 117 Whiting St., Galveston, TX (US) 77550

( * ) Notice: Subject to any disclaimer, the term of this patent is extended or adjusted under 35 U.S.C. 154(b) by 0 days.

(21) Appl. No.: 09/487,160

(22) Filed: Jan. 19, 2000

(51) Int. Cl.$^7$ .................................................. B60Q 3/06
(52) U.S. Cl. ...................... 362/485; 362/230; 362/246; 362/496; 362/543
(58) Field of Search .................... 362/230, 231, 362/246, 249, 251, 485, 496, 540, 541, 543, 544, 548, 549; 340/431

(56) References Cited

U.S. PATENT DOCUMENTS

| | | | |
|---|---|---|---|
| 4,182,532 | * | 1/1980 | Walker, Sr. ............................ 362/496 |
| 4,628,417 | | 12/1986 | Kaminski et al. .................... 362/485 |
| 4,777,569 | * | 10/1988 | Wen ...................................... 362/544 |
| 4,800,470 | * | 1/1989 | Hartsaw ................................ 362/543 |
| 4,818,006 | | 4/1989 | Arndt ...................................... 296/32 |
| 5,083,826 | * | 1/1992 | McCrary ............................... 362/485 |
| 5,150,284 | * | 9/1992 | Dobert .................................. 362/485 |
| 5,258,893 | * | 11/1993 | Finneyfrock ......................... 362/485 |
| 5,495,400 | | 2/1996 | Currie ................................... 362/551 |
| 5,795,051 | | 8/1998 | Galanski .............................. 362/485 |
| 6,000,821 | * | 12/1999 | Beliakoff .............................. 362/485 |
| 6,116,761 | * | 9/2000 | Munsey ................................ 362/485 |

* cited by examiner

Primary Examiner—Alan Cariaso
(74) Attorney, Agent, or Firm—David P. Gordon; David S. Jacobson; Thomas A. Gallagher

(57) ABSTRACT

A bed lighting system for a truck bed or other wheeled vehicle having a bed with rails which includes a plurality of lamps coupled via a switch to a power source. The lamps are installed on the undersides of the top rails of the truck bed. The lamps are sized such that they fit within the top rail of the side wall and do not extend substantially below a bottom lip of the top rail. In this manner, the lamps are protected from weather and from accidental damage caused by contact with objects contained within the truck bed. Further, the lamps are substantially hidden from view even when a tailgate of a truck is removed.

22 Claims, 4 Drawing Sheets

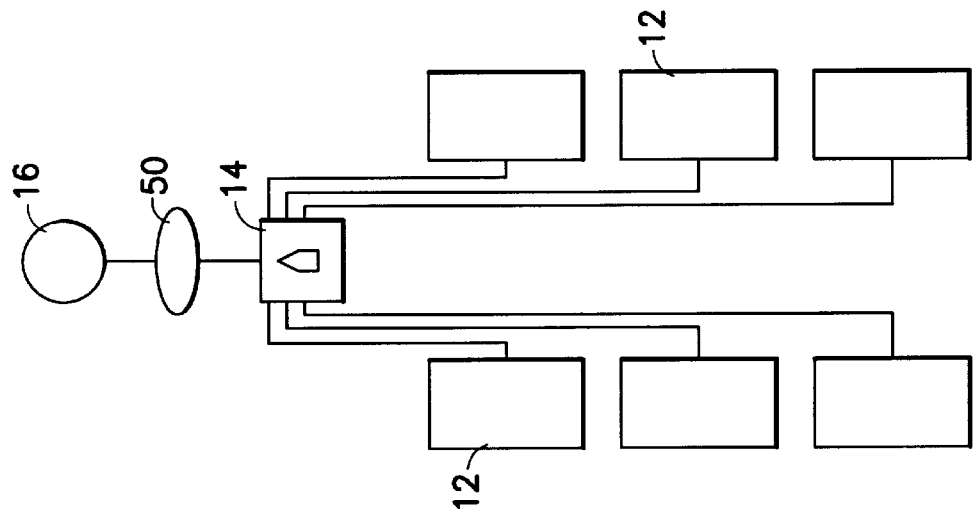
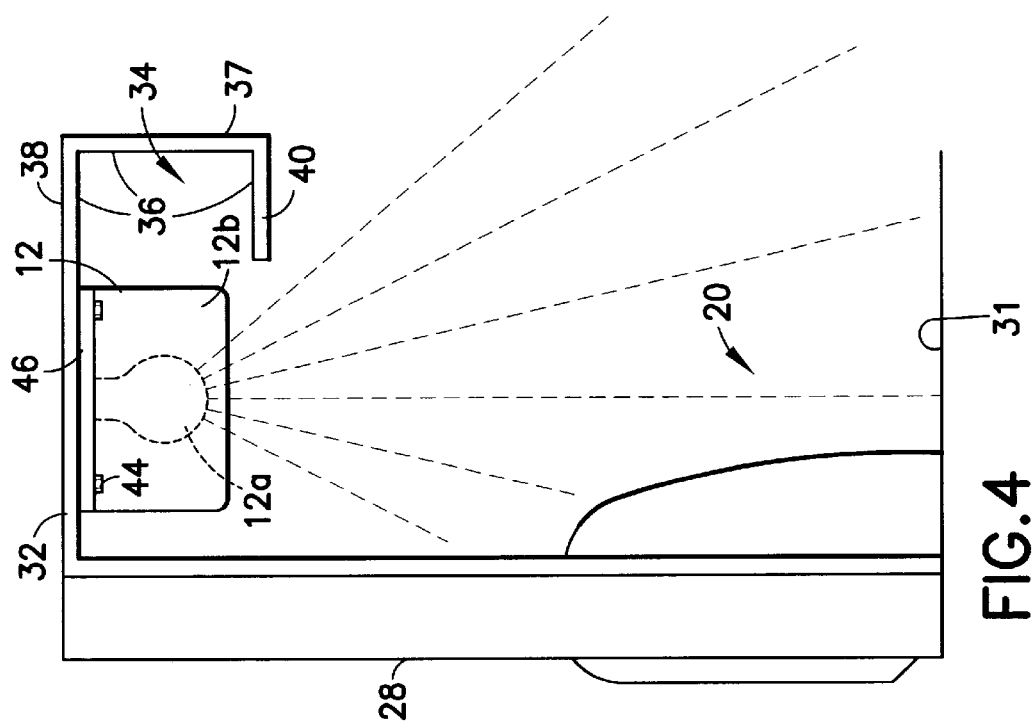

TRUCK BED LIGHTING SYSTEM

BACKGROUND OF THE INVENTION

1. Field of the Invention

This invention relates broadly to vehicle accessories. More particularly, this invention relates to a lighting system for illuminating the bed of a truck or similar vehicle.

2. State of the Art

In recent years truck ownership has increased substantially. Today, trucks are used for more than hauling large loads. Truck owners view their trucks as a personal statement i.e., a reflection of their character, attitude, and personality. Truck owners appreciate the functional utility and versatility that trucks can offer over the more prevalent sedans or 18. Every year, truck owners spend considerable sums of money improving and personalizing the functionality and appearance of their trucks.

While there are many important benefits to owning a truck, there are a few shortcomings. For example, while the interior of a sedan or minivan can easily be illuminated by an overhead lighting system, this is not possible in an open truck bed. Although trucks generally have an overhead light mounted within the cab itself, this light is not sufficiently bright or properly directed to adequately illuminate the truck bed. While exterior lights are sometimes mounted rearward on rollover bars or on the top or rear of the truck cab, these lights cannot be used to illuminate the truck bed while the vehicle is being driven down a road, as these lights will temporarily blind drivers behind the truck. In some states, even if the lights are facing the front of the truck, the lights above the cab must have a cover to prevent them from accidentally temporarily blinding other drivers.

While mounting lights on the cab of the truck may be helpful and better than having no lights, they are not really effective in properly illuminating the entire truck bed without temporarily blinding someone approaching the truck bed from the rear. Further, they do not eliminate the need for the owner to use a flashlight when rummaging about the back bed, because of the shadows and uneven lighting conditions which result when taller objects are properly positioned closer to the cab of the truck thereby blocking the lights from illuminating shorter objects closer to the tailgate of the truck. Still further, such additional equipment is bulky and significantly affects the look and aerodynamics of the vehicle.

An attempt to address these shortcomings was presented in U.S. Pat. No. 5,795,051 of Galanski. The '051 patent discloses a rearward facing lighting system designed to be mounted between the side walls of the truck bed against the front wall of the bed near the rear wall of the cab of the truck. The rearward facing lighting system of the '051 patent is oriented such that the top wall of the lighting system support is positioned generally level with the top of the side walls of the truck bed such that the rearward facing light assemblies are positioned below the top of the bed of the truck. In this manner, the truck bed may be illuminated even if a bed cover is installed. While the invention of the '051 patent alleviates some of the problems associated with traditional truck bed lighting systems, it does not adequately address the problems associated with having rearward facing lights mounted on a truck. Nor does it address or reduce the problems associated with uneven distribution of light along the length of the truck bed. Actually, because the lighting system of the '051 patent is mounted below the level of more traditional lighting systems, it actually accentuates many of the problems associated with uneven and inadequate lighting of the truck bed, as it creates even greater potential for shadows and unilluminated spaces in the truck bed. Further, the truck lighting system of the '051 patent requires the installation of a mounting system, which reduces the functionality of the truck bed by blocking valuable space in the back of the truck bed closest to the cab. Still further, the truck owner may wish instead to install a tool box or other functional accessory which is generally mounted closest to the truck cab. Still further, because these lights are exposed to the interior of the truck bed, they can easily be damaged by weather or by inadvertent contact of object stored in the truck bed. Also, because the truck lighting system of the '051 patent faces rearward and shines light in the direction of drivers behind the truck, it requires that a tailgate of a truck be in the closed position when the lights are illuminated to prevent the temporary blinding of drivers behind the vehicle.

What is needed is a truck lighting system which can accomplish one or more of the following: (i) effectively illuminate the entire length of the truck bed without temporarily blinding drivers behind the vehicle or those positioned at the tailgate of the truck even when the tailgate is removed; (ii) be protected from accidental damage due to contact with objects contained within the truck bed or due to damage from weather; (iii) will not impede the use of the entire space of the truck bed nor distract from the intended aesthetic design of the truck; and (iv) can be easily installed either in the factory or after market without modification to the design of the truck.

SUMMARY OF THE INVENTION

It is therefore an object of the invention to provide a truck bed lighting system which illuminates the entire bed of a truck.

It is another object of the invention to provide a truck bed lighting system which illuminates the bed of a truck without blinding other drivers or those standing behind or beside the truck.

It is a further object of the invention to provide a truck bed lighting system which is relatively inexpensive, does not require extensive modification to the design of the truck, and is simple to install both in the factory and as an after-market accessory.

In accord with these objects, which will be discussed in detail below, the invention takes advantage of a feature of the truck bed which was not previously considered an advantage for lighting. The truck bed lighting system of the invention generally includes a plurality of lamps mounted along the undersides of the top rails of the truck sidewalls, and a switch electrically connected to said plurality of lamps. The switch and lamps are typically coupled to each other and a battery via wiring which may likewise run along the underside of the top rails. When on, the lamps illuminate the bed of the truck.

According to a preferred aspect of the invention, the lamps are arranged so that they do not extend substantially below a bottom lip of the top rail of the sidewall. In this manner, substantially all light from the lamps is directly downward toward the bed of the truck, and will not be directed out above the rails or tail of the truck. The lamps may constitute discrete lamps with diffusers, or strip lighting units. Various different mounting mechanisms for mounting the lamps to the underside of the top rails may be utilized. If desired, at least one additional lamp may be located along the underside of a channel along the front wall of the truck bed. Further, if desired, at least one additional lamp may be located along the inside wall of the tailgate.

The system of the invention effectively illuminate the entire length of the truck bed without blinding drivers behind the vehicle or those positioned at the tailgate of the truck even when the tailgate is removed. In addition, by locating the lamps on the underside of the top rails, the lamps are protected from accidental damage due to contact with objects contained within the truck bed or due to damage from weather, and not impede the use of the entire space of the truck bed. Further, the system of the invention is easily installed either in the factory or after market without modification to the design of the truck.

Additional objects and advantages of the invention will become apparent to those skilled in the art upon reference to the detailed description taken in conjunction with the provided figures.

BRIEF DESCRIPTION OF THE DRAWINGS

FIG. 4 shows a rear sectional view along line AA of FIG. 1; and

FIG. 5 shows a wiring diagram of the embodiment of the truck bed lighting system of FIG. 1.

DETAILED DESCRIPTION OF THE PREFERRED EMBODIMENTS

Figure 1:
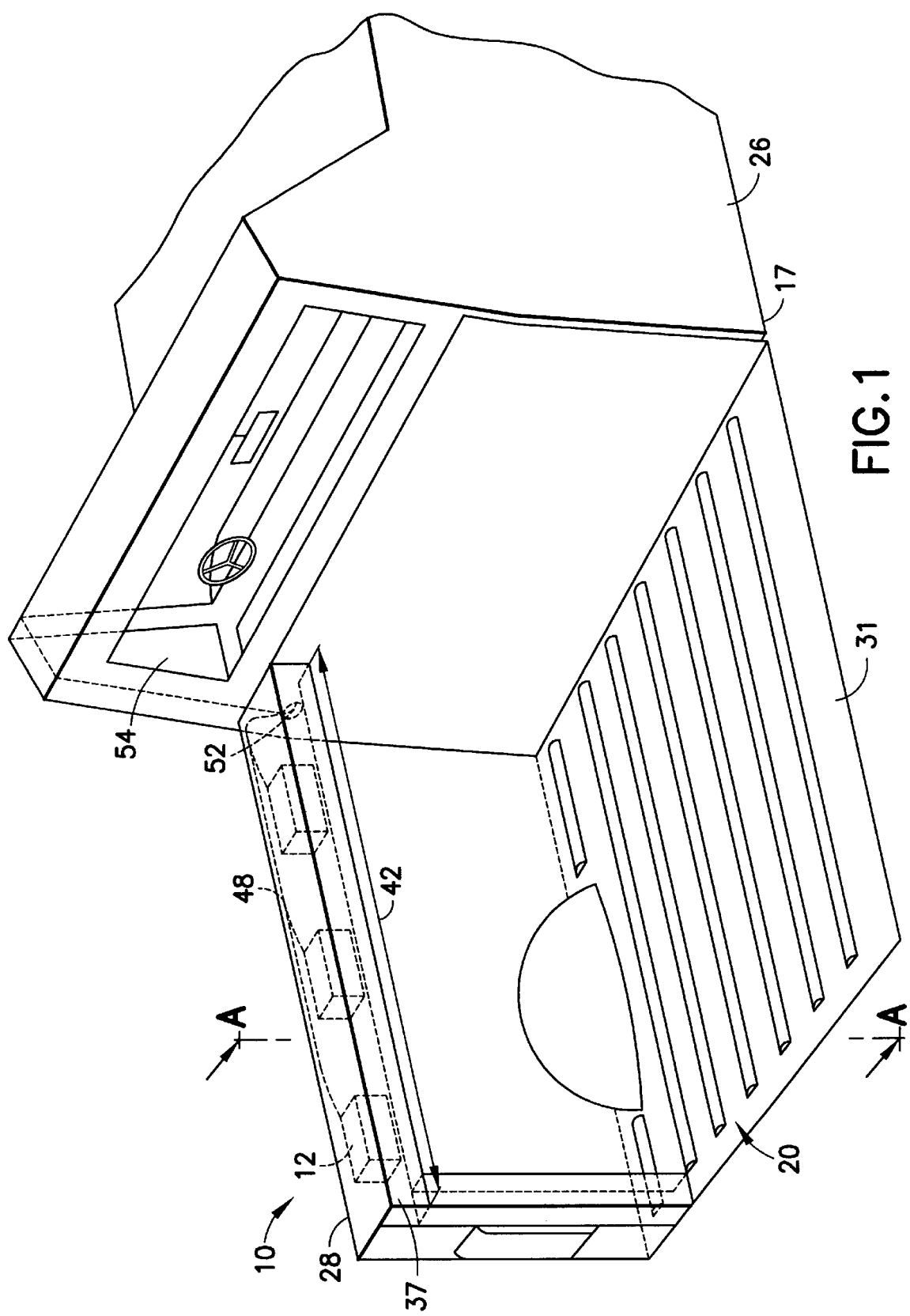
FIG. 1 shows a partial perspective view of an embodiment of a truck bed lighting system in tandem with a truck body.
Figure 2:
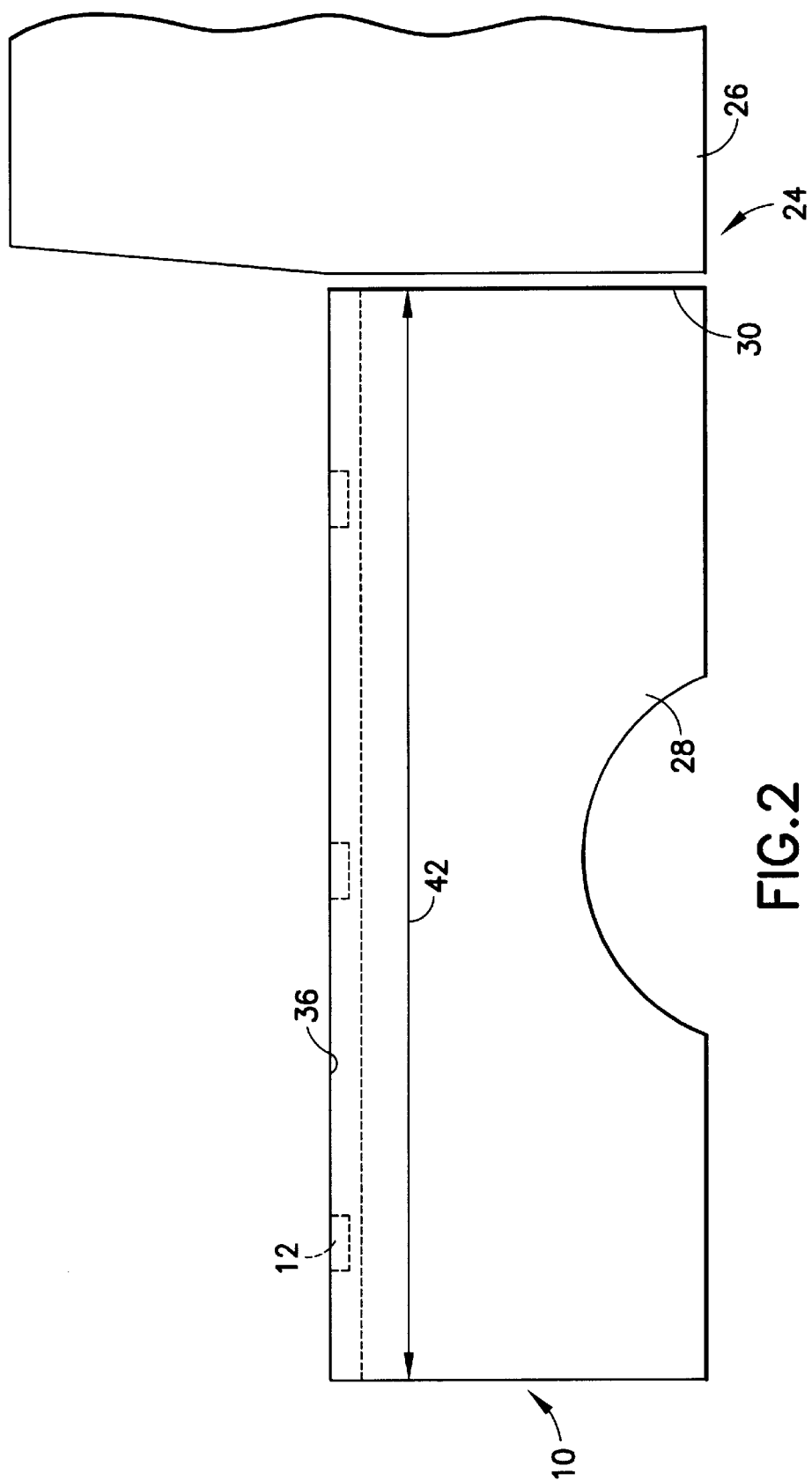
FIG. 2 shows a partial side view of the embodiment of the truck bed lighting system of FIG. 1 in tandem with a truck body.
Figure 3:
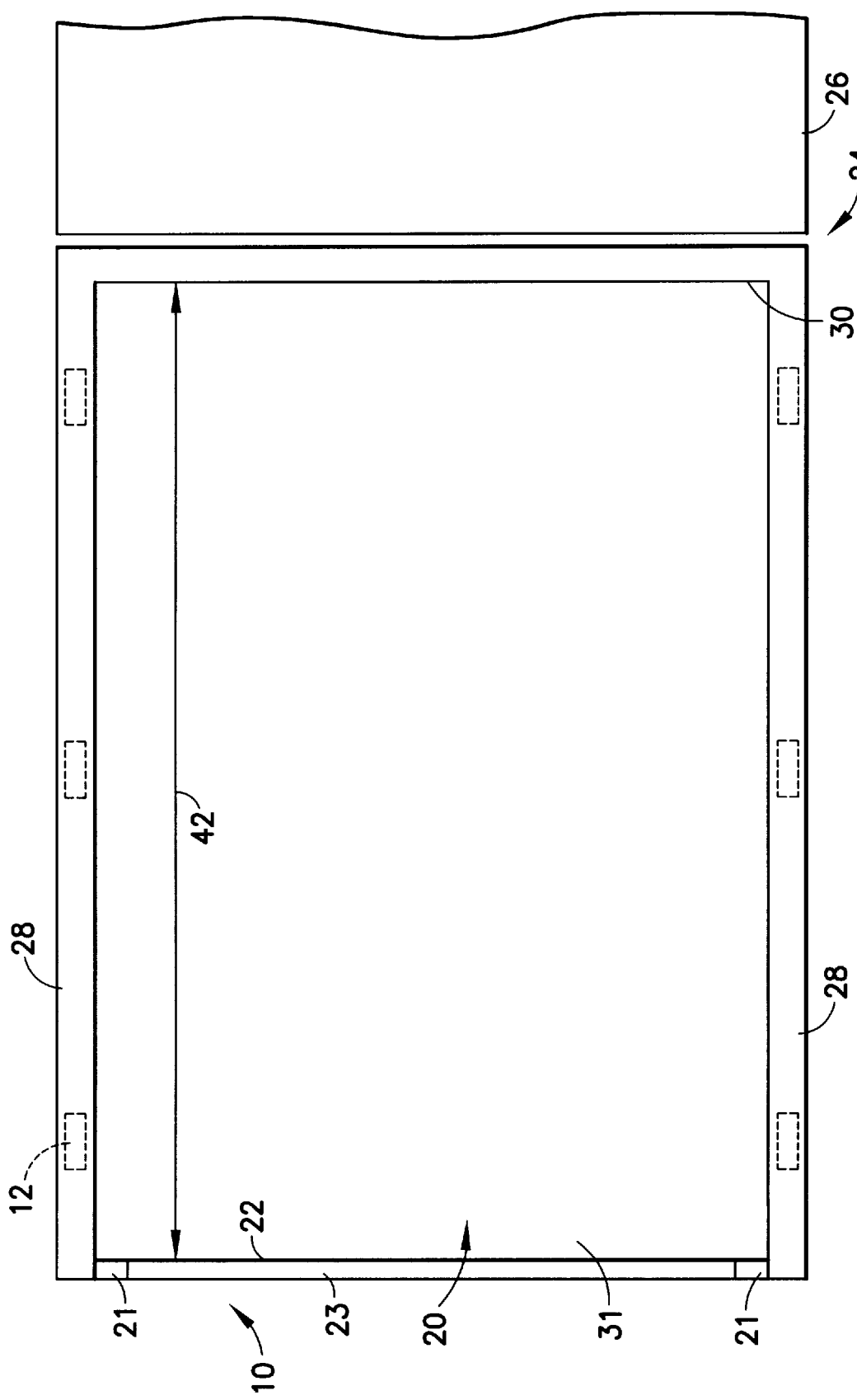
FIG. 3 shows a partial top view of the embodiment of the truck bed lighting system of FIG. 1 in tandem with a truck body.

FIGS. 1, 2, and 3, show a perspective view, side view, and top view respectively of an embodiment of a truck bed lighting system 10 designed according to the invention. The system 10 generally includes a plurality of lamps 12, a switch 14 (shown in FIG. 5), and a power source 16 (shown in FIG. 5). The system 10 is designed to be installed on a truck 17 having a truck bed 20 and a cab 26. The truck bed 20 includes sides walls 28, a front wall 30 near the rear of the cab 26, and a floor 31. Referring to FIGS. 1 through 4, each of the side walls 28 of the truck bed 20 has a top rail 32, generally formed as a channel 34, having an underside 36, a side 37, a top 38, and a bottom lip 40.

According to a preferred embodiment shown in FIGS. 1, 2, and 3, there are three substantially evenly spaced lamps 12 installed along the underside 36 of the length 42 of each of the top rails 32 of the side walls 28. The lamps 12 are installed such that light emitted from the lamps is directed downward toward the floor 31, thereby illuminating the truck bed 20. As shown in FIG. 4, the lamps 12 are preferably secured by screws 44 into brackets 46 affixed to the underside 36 of the top rail 32 of the side wall 28. As discussed hereinafter, many different mechanisms can be used to mount the lamps to the rails 32.

Referring to FIG. 5, the lighting system 10 is preferably wired by running a plurality of wires 48 between the lamps 12 and the switch 14. The switch is coupled to the power source 16 (i.e., a battery) through a fuse panel 50. Still referring to FIG. 5 and as shown in FIG. 1, the wires 48 of the preferred embodiment are run along the underside 36 of the top rail 32 and then out of the truck bed 20 through a hole 52 in the front wall 30 of the truck bed 20 into a hole (not shown) in the truck cab 26 to the fuse panel 50. The switch 14 is preferably located within an interior 54 of the truck cab 26 within easy reach of a driver. When the switch 14 is engaged, current from the power source 16 is directed through a fuse (not shown) in the fuse panel 50, along the plurality of wires 48 to the lamps 12.

According to a preferred aspect of the invention, the lamps 12 of the truck bed lighting system 10 are sized such that they fit on the underside 36 of the top rail 32 of the side wall 28, and do not extend substantially below the bottom lip 40. In this manner, they are protected from the weather and from accidental damage caused by contact with objects (not shown) contained within the truck bed 20. Further, by locating the lamps within the channel, light emanating from the lamps shines downward and outward onto the truck floor 31 and does not blind drivers behind the truck even when a tailgate of the truck bed 20 is removed. Because the lamps 12 are not visible when they are not illuminated, the truck bed lighting system 10 of the invention is inconspicuous. Further, the truck bed lighting system 10 is designed to either be factory installed or installed as an after-market accessory with minimal work and with no required modification to the shape or design of the truck body 24.

Different mechanisms for mounting the lamps 12 to the rails 32 may be utilized. For example, the lamps may be directly attached to the underside of the top rail via the use of screws or bolts, hook and loop tape (e.g., VELCRO®), bonding agents (e.g., glue or epoxy cement), magnets, etc. Alternatively, the lamps may be indirectly attached to the underside of the top rail by providing an attachment strip or bracket secured to the underside of the top rail, and attaching the lamps to that attachment strip or bracket. The attachment strip or bracket may be formed from inter alia, wood, metal, or plastic.

In addition, according to the invention, different types of lamps 12 can be utilized. For example, while discrete lamps 12 with bulbs 12a and diffusers 12b are shown, other lamps such as strip lighting, LEDs, neon lights, halogen lights, etc., may be utilized with or without diffusers.

Referring again to FIG. 3, in addition to providing lamps 12 along the rails 32, it will be appreciated that additional lamps may be provided along a channel provided on the front wall 30 of the truck bed 20. In addition, where tailgate supports 21 or stops are provided at the back of the bed 20, forwardly-directed lamps (i.e., lamps directed toward the front wall 30) may be mounted along those supports 21 or in any channel provided therein. Further, if desired, lamps may be mounted along a length of an inside wall 22 of a tailgate 23 if independently wired or if provided with a detachable plug (not shown) such that the lamps on the tailgate 23 may be disengaged from the truck bed lighting system 10 without affecting the operation of the remainder of the lamps when the tailgate 23 is lowered or removed.

There have been described and illustrated herein several embodiments of a truck bed illuminating system which can effectively illuminate the entire length of the truck bed without blinding drivers behind the vehicle. While a particular embodiment of the invention has been described, it is not intended that the invention be limited thereto, as it is intended that the invention be as broad in scope as the art will allow and that the specification be read likewise. Thus, while three lamps are shown mounted along the length of the underside of each of the top rails, it is understood that there may be fewer or more lamps. It is understood that the lamps may be wired either in series or in parallel. However, it will be appreciated that it is preferable that the truck bed lighting system be provided with more than one lamp and that the lamps be wired such that if one bulb burns out the remainder of lamps may still be illuminated. Further, while it is preferable that the lamps not extend below the bottom lip of the top rails, it is understood that a truck bed lighting system may be designed such that the lamps extend below the bottom lip provided the light is directed or reflected in a manner which will significantly reduce the visibility of the light source to a driver behind the truck. In addition, while the lamps are shown as being mounted parallel to the top of the top rail, it will be appreciated that the devices may be installed such that they are angled slightly to direct more light toward the center of the truck bed. Likewise, while the lamps are shown as being mounted to the underside of the top of the top rail, it will be appreciated that the lamps may be mounted to the underside of one or more of the side, lip, and top of the top rail. Also, while it is disclosed that the truck bed lighting system is preferably wired to the truck fuse panel, it is understood that a truck bed lighting system designed according to the invention may instead be wired either directly to a battery of the truck or into the existing dome light circuit of the truck, or to an auxiliary battery. Also, it will be appreciated that the lamps may also be wired to a dimmer switch to regulate the amount of light emanating from the lamps. It will further be appreciated that the lamps can be fitted with colored bulbs or colored diffusers. Additionally, where the truck bed lighting system is disclosed for use in illuminating the truck bed, it will be appreciated that the system may be used on other vehicles including but not limited to any other cart or wheeled vehicle having rails suitable for mounting the lighting system. It will further be appreciated that the truck bed lighting system may be used in conjunction with a camper shell or truck cap. It will therefore be appreciated by those skilled in the art that yet other modifications could be made to the provided invention without deviating from its spirit and scope as claimed.

What is claimed is:

1. A lighting system for a truck which includes a cab, a truck bed to the rear of the cab, the truck bed being defined by side walls, and a front wall to the rear of the cab between the side walls, the side walls each having a top rail forming a channel, each top rail having an underside and a bottom lip, said lighting system comprising:
    a) a plurality of lamps mounted along the underside of the respective top rails and when on, illuminating the bed; and
    b) a switch electrically connected to said plurality of lamps.

2. A lighting system according to claim 1, further comprising:
    c) battery means coupled to said switch for providing power to said plurality of lamps.

3. A lighting system according to claim 1, wherein:
    said plurality of lamps comprises at least three lamps mounted along the underside of each of the top rails.

4. A lighting system according to claim 1, wherein:
    said lamps are arranged so that they do not extend substantially below the bottom lip of the top rail.

5. A lighting system according to claim 1, wherein:
    the channel has a first height and said lamps have a second height, said first height being greater than said second height.

6. A lighting system according to claim 1, wherein:
    said switch is located within the cab of the pickup truck.

7. A lighting system according to claim 1, further comprising:
    c) a plurality of wires electrically coupling said lamps to said switch, said plurality of wires running at least partially along the underside of the top rails.

8. A lighting system according to claim 1, wherein:
    said plurality of lamps comprise a plurality of strip lights.

9. A lighting system according to claim 1, wherein:
    said plurality of lamps comprise a plurality of discrete lamps covered by discrete diffusing means for diffusing light from said lamps into the bed.

10. A lighting system according to claim 1, further comprising:
    c) mounting means for mounting said plurality of lamps to the underside of the top rails.

11. A lighting system according to claim 10, wherein:
    said mounting means comprises one of screws, bolts, hook-and-loop tape, double-sided tape, and a bonding agent.

12. A lighting system according to claim 1, where the front wall of the truck bed defines another channel having an underside and a bottom lip, and wherein:
    said plurality of lamps comprises at least one lamp mounted along the underside of the channel of the front wall, said at least one lamp arranged so that it does not extend substantially below the bottom lip of the channel of the front wall.

13. A lighting system for a truck which includes a cab, a truck bed to the rear of the cab, the truck bed being defined by side walls, and a front wall to the rear of the cab between the side walls, the side walls each having a top rail forming a channel, each top rail having an underside and a bottom lip, said lighting system comprising:
    a) a plurality of lamps which when on, illuminate the bed;
    b) mounting means for mounting said plurality of lamps to the underside of the top rails;
    c) a switch;
    d) a plurality of wires electrically coupling said lamps to said switch, said plurality of wires running at least partially along the underside of the top rails; and e) battery means coupled to said switch for providing power to said plurality of lamps.

14. A lighting system according to claim 13, wherein:

said lamps are arranged so that they do not extend substantially below the bottom lip of the top rail.

15. A lighting system according to claim 14, wherein:

said plurality of lamps comprise a plurality of discrete lamps covered by discrete diffusing means for diffusing light from said lamps into the bed.

16. A lighting system according to claim 15, wherein:

said plurality of lamps are fitted with a plurality of colored bulbs and a plurality of colored diffusing means.

17. A lighting system according to claim 13, wherein:

said plurality of lamps are wired such that the truck bed lighting system will provide illumination to the bed even if any of said plurality of lamps does not function.

18. A lighting system according to claim 13, wherein:

said plurality of lamps comprise a plurality of strip lights.

19. A lighting system for a truck according to claim 13 which further includes a tailgate having an inside wall, further comprising:

f) a plurality of lamps mounted on the inside wall of the tailgate.

20. A lighting system according to claim 19, wherein:

said plurality of lamps mounted on the tailgate are detachably coupled to the truck bed lighting system such that the tailgate is removable and said plurality of lamps mounted to the underside of the top rails remain illuminatable.

21. A lighting system according to claim 13, further comprising:

f) a plurality of lamps mounted on the front wall.

22. A lighting system for a wheeled vehicle which includes a bed being defined by side walls, and a front wall between the side walls, the side walls each having a top rail forming a channel, each top rail having an underside and a bottom lip, said lighting system comprising:

a) a plurality of lamps which when on, illuminate the bed;
b) mounting means for mounting said plurality of lamps to the underside of the top rails;
c) a switch;
d) a plurality of wires electrically coupling said lamps to said switch, said plurality of wires running at least partially along the underside of the top rails; and
e) battery means coupled to said switch for providing power to said plurality of lamps.

\* \* \* \* \*